United States Patent
Shingyoji

(10) Patent No.: US 10,677,931 B2
(45) Date of Patent: Jun. 9, 2020

(54) POSITIONING APPARATUS, POSITIONING METHOD, AND RECORDING MEDIUM

(71) Applicant: CASIO COMPUTER CO., LTD., Tokyo (JP)

(72) Inventor: Ryuji Shingyoji, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 417 days.

(21) Appl. No.: 15/464,621

(22) Filed: Mar. 21, 2017

(65) Prior Publication Data

US 2017/0276798 A1    Sep. 28, 2017

(30) Foreign Application Priority Data

Mar. 23, 2016 (JP) .................................. 2016-057940

(51) Int. Cl.
*G01S 19/37* (2010.01)
*G01S 5/02* (2010.01)

(52) U.S. Cl.
CPC ............ *G01S 19/37* (2013.01); *G01S 5/02* (2013.01)

(58) Field of Classification Search
CPC . G01S 19/37; G01S 5/02; G01S 19/28; G01S 19/425
USPC ........................................ 342/377, 357, 359
See application file for complete search history.

(56) References Cited

U.S. PATENT DOCUMENTS

| 7,236,883 B2 * | 6/2007 | Garin ............... G01S 19/235 342/357.62 |
| 8,614,641 B2 * | 12/2013 | Yule ............... G01S 5/0036 342/357.28 |
| 2011/0163914 A1 | 7/2011 | Seymour | |

FOREIGN PATENT DOCUMENTS

| CN | 101903793 A | 12/2010 |
| CN | 103069299 A | 4/2013 |
| JP | 2009-264928 A | 11/2009 |
| JP | 2013-88344 A | 5/2013 |
| JP | 2015-161588 A | 9/2015 |

OTHER PUBLICATIONS

CNIPA; Application No. 201710176201; Office Action dated Aug. 28, 2019.

(Continued)

*Primary Examiner* — Bo Fan
(74) *Attorney, Agent, or Firm* — Fitch, Even, Tabin & Flannery LLP

(57) ABSTRACT

A positioning apparatus includes one or more processors; and one or more memories storing instructions that cause the processors to perform the following. Performing first receiving to receive one piece of orbit information showing a position of one positioning satellite and which attempts to receive another piece of orbit information showing a position of another positioning satellite. Performing first obtaining to obtain the another piece of orbit information (i) when receiving the another piece of orbit information is attempted but the another piece of orbit information is not received and the another piece of orbit information is received by the another positioning apparatus or (ii) when, the another piece of orbit information received by the another positioning apparatus is newer than that received in the first receiving. Performing positioning processing based on the one piece of (Continued)

received orbit information and the another piece of obtained orbit information.

10 Claims, 6 Drawing Sheets

(56) References Cited

OTHER PUBLICATIONS

JPO; Application No. 2016-057940; Notice of Reasons for Refusal dated Jan. 21, 2020.

* cited by examiner

FIG.4A

RECEPTION SUMMARY DATABASE DB
[APPARATUS NO. 1]

| SATELLITE IDENTIFICATION NO. | VALIDITY | RECEIVING TIME |
|---|---|---|
| 1 | 1 | 20:10 |
| 2 | 0 | — |
| ⋮ | ⋮ | ⋮ |
| 31 | 0 | — |
| 32 | 1 | 20:30 |
| ⋮ | ⋮ | ⋮ |

FIG.4B

RECEPTION SUMMARY DATABASE DB
[APPARATUS NO. 2]

| SATELLITE IDENTIFICATION NO. | VALIDITY | RECEIVING TIME |
|---|---|---|
| 1 | 1 | 21:00 |
| 2 | 1 | 20:30 |
| ⋮ | ⋮ | ⋮ |
| 31 | 1 | 20:50 |
| 32 | 0 | — |
| ⋮ | ⋮ | ⋮ |

FIG.4C

RECEPTION SUMMARY DATABASE DB
[APPARATUS NO. 3]

| SATELLITE IDENTIFICATION NO. | VALIDITY | RECEIVING TIME |
|---|---|---|
| 1 | 0 | — |
| 2 | 1 | 21:00 |
| ⋮ | ⋮ | ⋮ |
| 31 | 0 | — |
| 32 | 1 | 21:00 |
| ⋮ | ⋮ | ⋮ |

FIG.5

DETAILED REQUEST LIST DATA R

| APPARATUS NO. | SATELLITE IDENTIFICATION NO. | VALIDITY | RECEIVING TIME |
|---|---|---|---|
| 2 | 2 | 1 | 20:30 |
| ⋮ | ⋮ | ⋮ | – |
| 2 | 31 | 1 | 20:50 |
| 3 | 32 | 1 | 21:00 |
| ⋮ | ⋮ | ⋮ | ⋮ |

FIG.6

DETAILED INTEGRATED DATA

| SATELLITE IDENTIFICATION NO. | VALIDITY | RECEIVING TIME | DETAILED ORBIT INFORMATION |
|---|---|---|---|
| 1 | 1 | 20:10 | DATA1 |
| 2 | 1 | 20:30 | DATA2 |
| ⋮ | ⋮ | ⋮ | ⋮ |
| 31 | 1 | 20:50 | DATA31 |
| 32 | 1 | 21:00 | DATA32 |
| ⋮ | ⋮ | ⋮ | ⋮ |

POSITIONING APPARATUS, POSITIONING METHOD, AND RECORDING MEDIUM

CROSS-REFERENCE TO RELATED APPLICATION

This application is based upon and claims the benefit of priority from the prior Japanese Patent Application No. 2016-057940, filed Mar. 23, 2016, the entire contents of which are incorporated herein by reference.

BACKGROUND

1. Technical Field

The present invention relates to a positioning apparatus, a positioning method, and a recording medium.

2. Description of Related Art

Conventionally, a positioning apparatus which measures a position using a GNSS such as GPS, Glonass, Galileo, etc. is well-known. Such positioning apparatus calculates a pseudo range to a plurality of positioning satellites based on positioning codes received from each positioning satellite transmitting the positioning codes. The positioning apparatus also calculates a position of each positioning apparatus based on detailed orbit information (ephemeris information). The apparatus main body position is measured using the above calculated results.

Depending on the position where the positioning apparatus is attached or the change in reception environment during movement, it may be difficult to evenly receive and decode within a short amount of time navigation messages from the positioning satellites positioned in various positions in the sky. As a result, the accuracy of the position may be worsened in positioning processing using the navigation messages from a small number of positioning satellites with deviation.

Japanese Patent Application Laid-Open Publication No. 2013-88344 describes a communication apparatus which obtains navigation messages received with peripheral terminals and performs positioning processing using the obtained navigation messages.

However, according to the technique described in Japanese Patent Application Laid-Open Publication No. 2013-88344, the communication apparatus is specified in advance for each positioning satellite, and when the navigation message cannot be obtained from the positioning satellite specified in the communication apparatus, the accuracy of the positioning processing cannot be enhanced.

BRIEF SUMMARY

According to an aspect of the present invention, there is provided, a positioning apparatus including: one or more processors; and one or more memories storing instructions that, when executed by the one or more processors, cause the one or more processors to perform: first receiving to receive one piece of orbit information showing a position of one positioning satellite within one predetermined term transmitted from the one positioning satellite and which attempts to receive another piece of orbit information showing a position of another positioning satellite within another predetermined term transmitted from another positioning satellite different from the one positioning satellite; first obtaining to obtain the another piece of orbit information received by another positioning apparatus (i) when, in the first receiving, receiving the another piece of orbit information is attempted but the another piece of orbit information is not received and the another piece of orbit information is received by the another positioning apparatus or (ii) when, in the first receiving, the another piece of orbit information received by the another positioning apparatus is newer than the another piece of orbit information received in the first receiving; and positioning processing based on the one piece of orbit information received in the first receiving and the another piece of orbit information obtained in the first obtaining.

According to another aspect, there is provided a positioning method using a positioning apparatus including: first receiving to receive one piece of orbit information showing a position of one positioning satellite within one predetermined term transmitted from the one positioning satellite and which attempts to receive another piece of orbit information showing a position of another positioning satellite within another predetermined term transmitted from another positioning satellite different from the one positioning satellite; first obtaining to obtain the another piece of orbit information received by another positioning apparatus (i) when, in the first receiving, receiving the another piece of orbit information is attempted but the another piece of orbit information is not received and the another piece of orbit information is received by the another positioning apparatus or (ii) when, in the first receiving, the another piece of orbit information received by the another positioning apparatus is newer than the another piece of orbit information received in the first receiving; and positioning processing based on the one piece of orbit information received in the first receiving and the another piece of orbit information obtained in the first obtaining.

According to another aspect, there is provided a non-transitory recording medium having a program recorded thereon that is executable to control a computer to perform: first receiving one orbit information showing a position of one positioning satellite within one predetermined term transmitted from the one positioning satellite and attempting to receive another orbit information showing a position of another positioning satellite within another predetermined term transmitted from another positioning satellite different from the one positioning satellite; first obtaining the another orbit information received by another positioning apparatus when the receiving of the another orbit information is attempted but the another orbit information is not received and the another orbit information is received by the another positioning apparatus or the another orbit information received by the another positioning apparatus is newer than the another orbit information received in the receiving; and positioning processing based on the one orbit information received in the receiving and the another orbit information obtained in the obtaining.

BRIEF DESCRIPTION OF THE DRAWINGS

The components in the drawings are not necessarily to scale relative to each other.

FIG. 4A is a diagram schematically showing an example of a reception summary database regarding the positioning processing shown in FIG. 3.

FIG. 4B is a diagram schematically showing an example of a reception summary database regarding the positioning processing shown in FIG. 3.

FIG. 4C is a diagram schematically showing an example of a reception summary database regarding the positioning processing shown in FIG. 3.

FIG. 5 is a diagram schematically showing an example of a detailed request list data regarding the positioning processing shown in FIG. 3.

FIG. 6 is a diagram schematically showing an example of a detailed integrated data regarding the positioning processing shown in FIG. 3.

DETAILED DESCRIPTION

An embodiment of the present invention is specifically described with reference to the drawings. The scope of the present invention is not limited to the illustrated examples.

Figure 1:
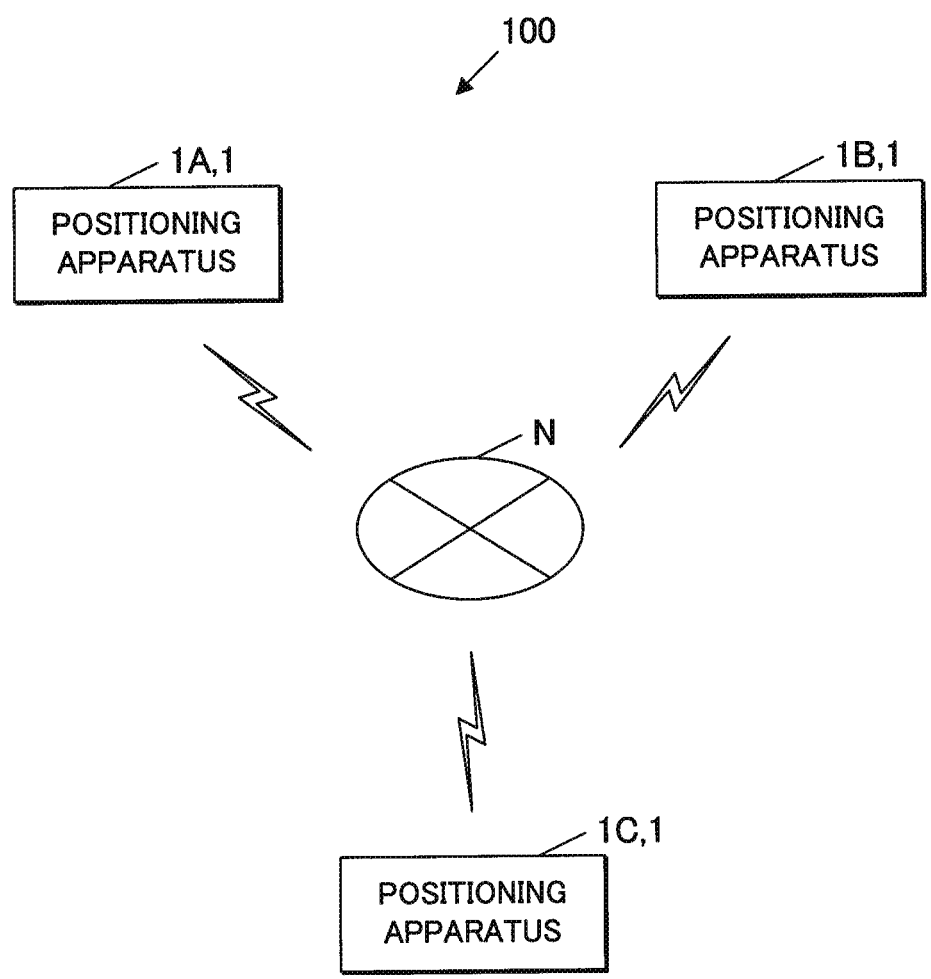
FIG. 1 is a diagram showing a schematic configuration of a positioning system according to an embodiment employing the present invention.

FIG. 1 is a diagram showing a schematic configuration of a positioning system 100 according to an embodiment employing the present invention.

As shown in FIG. 1, the positioning system 100 according to the present embodiment includes a plurality of positioning apparatuses 1, . . . (FIG. 1 shows three positioning apparatuses 1A to 1C) which are able to communicate through a predetermined communication network N.

For example, the plurality of positioning apparatuses 1 can be a dedicated data logger or a cellular phone or PHS (Personal Handy-phone System) provided with a unit for positioning. All of the plurality of positioning apparatuses 1, . . . do not have to be the same positioning apparatus 1, and do not have to be held by the same user.

The configuration and the operation of the plurality of positioning apparatuses 1, . . . are substantially the same. Therefore, the positioning apparatus 1A is described as the representative example.

Figure 2:
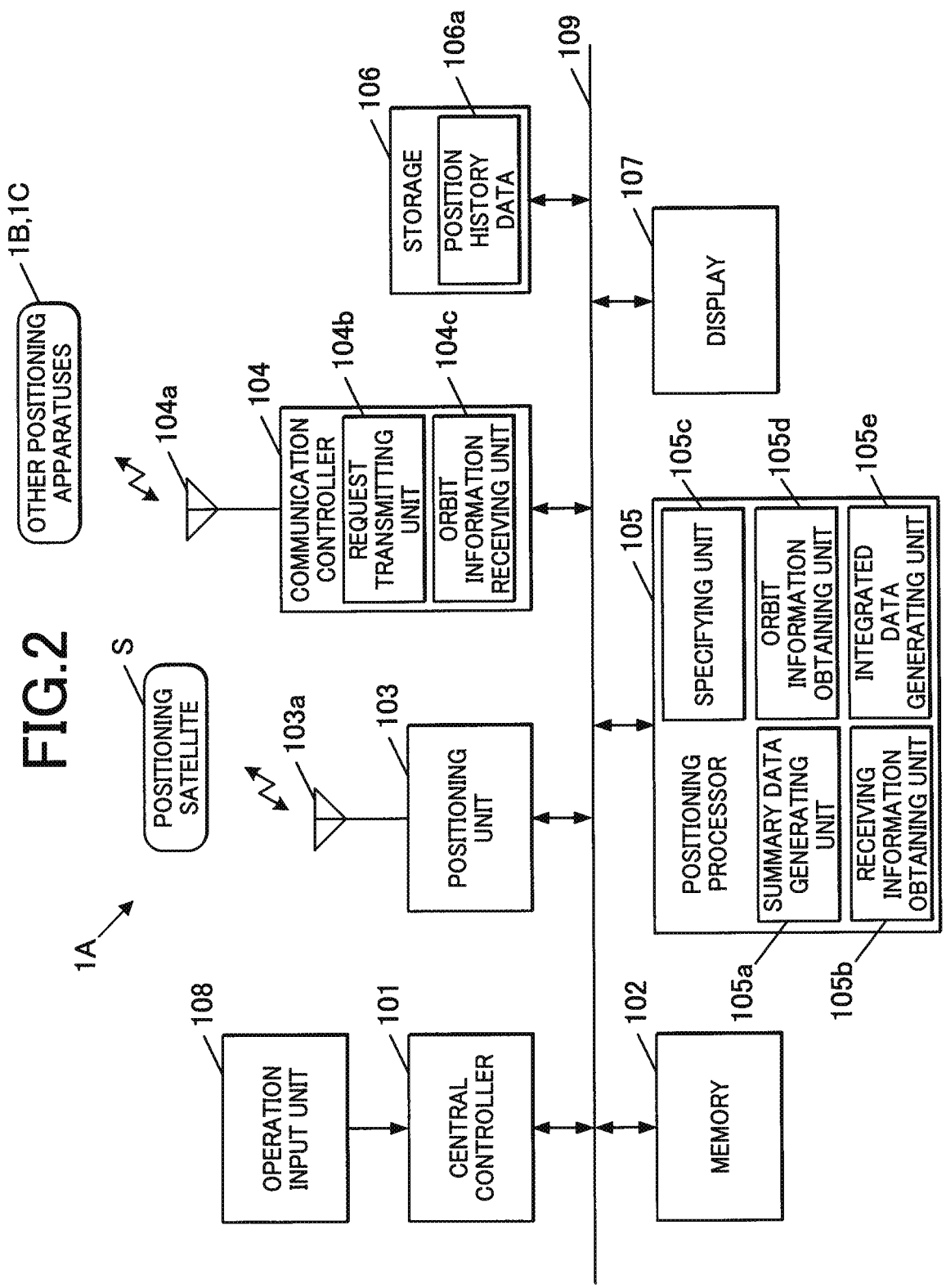
FIG. 2 is a block diagram showing a schematic configuration of a positioning apparatus in a positioning system shown in FIG. 1.

FIG. 2 is a block diagram showing a schematic configuration of a positioning apparatus 1A.

As shown in FIG. 2, the positioning apparatus 1A includes a central controller 101, a memory 102, a positioning unit 103, a communication controller 104, a positioning processor 105, a storage 106, a display 107, an operation input unit 108 and the like.

The central controller 101, the memory 102, the positioning unit 103, the communication controller 104, the positioning processor 105, the storage 106, and the display 107 are connected to each other through the bus line 109.

The central controller 101 controls each unit of the positioning apparatus 1A.

Specifically, the central controller 101 includes a CPU (Central Processing Unit) which controls each unit of the positioning apparatus 1A, a RAM (Random Access Memory), and a ROM (Read Only Memory). The central controller 101 performs various control according to various processing programs (not shown) for the positioning apparatus 1A.

For example, the memory 102 includes a DRAM (Dynamic Random Access Memory), etc. which temporarily stores data processed in the central controller 101 and each unit of the positioning apparatus 1A.

For example, One or more processors of the positioning unit 103, based on instructions stored in a program memory of the positioning unit 103 (not shown), uses the GNSS (Global Navigation Satellite System) such as a GPS (Global Positioning System), Glonass (Global Navigation Satellite System), Galileo, BeiDou Navigation Satellite System), etc. to measure the position where the main body of the positioning apparatus 1A is.

That is, for example, the positioning unit 103 is able to receive at a predetermined timing a signal (for example, C/A (Coarse and Acquisitions) code, a positioning code such as a P (Precise) code, etc., a navigation message such as detailed orbit information (for example, ephemeris information), and summary orbit information (for example, almanac information), and the like) with the receiving antenna 103a transmitted from a plurality of positioning satellites S, . . . (only one is shown in FIG. 1) launched into the earth's low orbit. That is, the positioning unit 103 tries at a predetermined timing to receive with the receiving antenna 103a the signal transmitted from the plurality of positioning satellites S, . . . , however, depending on the position of the positioning satellite S and the surrounding situation of the positioning apparatus 1A, there are signals which can be received with the receiving antenna 103a, and signals which cannot be received although an attempt is made. Then, the positioning unit 103 performs the positioning processing which measures the three-dimensional present position (latitude, longitude, altitude) of the positioning apparatus 1A main body with the three-dimensional positioning mode (3DFix) based on the signal received by the receiving antenna 103a.

Here, for example, the ephemeris information is orbit information showing a detailed position (orbit) of each GPS satellite as the positioning satellite S updated every 2 hours. The update of the ephemeris information is managed by the IODE (Issue of Data Ephemeris). That is, the detailed position of the GPS satellite can be measured with the ephemeris information within 2 hours from the update timing of the ephemeris information and within 4 hours from the receiving timing.

For example, the almanac information is orbit information showing an approximate position of all GPS satellites S as the positioning satellite S, updated every 24 hours.

The positioning unit 103 obtains detailed integrated data I generated in a later-described integrated data generating unit 105e, that is, detailed integrated data I (see FIG. 6, later-described) generated based on the detailed orbit information received by the receiving antenna 103a and the detailed orbit information received by other positioning apparatuses 1B, 1C. The positioning unit 103 performs predetermined calculating based on the obtained detailed integrated data I and calculates the position of each positioning satellite S. Then, for example, in the three-dimensional positioning mode, after calculating pseudo range information corresponding to each of at least 4 positioning satellites S, the positioning unit 103 performs predetermined calculating based on the position of each positioning satellite S in order to calculate three-dimensional coordinates (x, y, z) showing the position of the main body of the positioning apparatus 1A and the error of the clock in the main body of the positioning apparatus 1A. The position information of the position in the positioning apparatus 1A main body generated in the positioning unit 103 is output to the memory 102, and the information can be temporarily stored in the memory 102.

As described above, the receiving antenna 103a of the positioning unit 103 functions as the first receiving unit and receives one orbit information (for example, detailed orbit information such as ephemeris information, etc.) transmitted from a positioning satellite S (for example, GPS satellite) and showing the position of the one positioning satellite S within one predetermined amount of time. The receiving antenna 103a of the positioning unit 103 also attempts to receive other orbit information transmitted from the other positioning satellite S different from the one positioning satellite S showing the position of the other positioning satellite S within the other predetermined amount of time. The positioning unit 103 functions as the positioning unit and performs the positioning processing based on the received one orbit information and the other orbit information received by the other positioning apparatuses 1B, 1C.

When the receiving antenna 103a receives navigation messages transmitted from at least 4 positioning satellites S, the positioning unit 103 can perform the positioning processing without using the navigation message received by other positioning apparatuses 1B, 1C.

The communication controller 104 communicates with other positioning apparatuses 1B, 1C connected through the predetermined communication network N.

That is, for example, the communication controller 104 connects with other positioning apparatuses 1B, 1C through the wireless PAN realized by short range wireless communication standard in which the range that wireless communication is possible is limited to the predetermined range such as Bluetooth (registered trademark).

Specifically, for example, the communication controller 104 includes a control module (not shown) to perform Bluetooth communication between other positioning apparatuses 1B, 1C through the communication antenna 104a. Then, for example, the communication controller 104 performs communication setting processing called pairing in advance, and exchanges device information and authentication key data with the communication pair by wireless signals. With this, from then and after, the communication setting processing does not have to be performed each time, and the communication is connected or canceled automatically or semi-automatically with this communication pair.

Here, there are various versions of the communication standard by Bluetooth, such as "1.x", "2.x", "2.x+EDR", "3.x", "3.x+EDR", "2.x+HS", "4.x" with different communication speeds and in which applicable profile types (not shown) are different. The detailed description of the versions is omitted. For example, the communication controller 104 can cope with functions in both the version called "Bluetooth Classic" (for example, "2.x+EDR") which has downward compatibility and in the version called "Bluetooth Low Energy (BLE)" (for example, "4.x") which has no compatibility with other versions. The communication is performed with either standard of Bluetooth considering the communication speed, the power saving qualities, etc.

One or more processors of the communication controller 104, based on instructions stored in a program memory of the communication controller 104 (not shown), functions as a request transmitting unit 104b and orbit information receiving unit 104c.

The request transmitting unit 104b transmits instructions to transmit the detailed orbit information to other positioning apparatuses 1B, 1C.

That is, as the transmitting unit, the request transmitting unit 104b transmits the instruction to transmit the detailed orbit information regarding the positioning satellite S specified as the other positioning satellite S by a specifying unit 105c (described in detail later) to the other positioning apparatuses 1B, 1C through the predetermined communication network N.

Specifically, the request transmitting unit 104b obtains the detailed request list data R from the memory 102, refers to the detailed request list data R, and transmits to the other positioning apparatus 1 an instruction to transmit detailed orbit information of the positioning satellite S (for example, positioning satellite S with satellite identification No. 2) which is not received by the receiving antenna 103a and the detailed orbit information received by the other positioning apparatus 1 (for example, positioning apparatus 1B, etc.).

The orbit information receiving unit 104c receives the detailed orbit information transmitted from the other positioning apparatuses 1B, 1C.

That is, as the second receiving unit, the orbit information receiving unit 104c receives the detailed orbit information transmitted from the other positioning apparatuses 1B, 1C through the predetermined communication network N.

Specifically, when the other positioning apparatuses 1B, 1C receive the instruction to transmit the detailed orbit information transmitted from the request transmitting unit 104b, the communication controller 104 obtains the detailed orbit information corresponding to the transmitting instruction, and transmits the above to the positioning apparatus 1 (for example, positioning apparatus 1A, etc.) which is the transmitting source of the transmitting instruction through the predetermined communication network N. The orbit information receiving unit 104c receives the detailed orbit information transmitted from the other positioning satellites 1, for example, the detailed orbit information of positioning satellites S with the satellite identification No. 2, 31 transmitted from the positioning apparatus 1B and the detailed orbit information of the positioning satellite S with the satellite identification No. 32 transmitted from the positioning apparatus 1C (see FIG. 5).

Here, the communication controller 104 of the other positioning apparatuses 1B, 1C can transmit the detailed orbit information which is to be transmitted after performing processing to convert the information to a predetermined format or the orbit information receiving unit 104c can perform processing to return the format of the received detailed orbit information to the original state.

The received detailed orbit information may be output to the memory 102 and temporarily stored in the memory 102.

The communication controller 104 may include, for example, a wireless LAN module, etc. and may operate as Peer to Peer (ad hoc mode) to establish wireless communication lines directly with the other measuring apparatuses 1B, 1C without using the external access point. The communication controller 104 may also communicate with the other positioning apparatuses 1B, 1C by other communicating methods such as W-CDMA (Wideband Code Division Multiple Access) method, GSM (Global System for Mobile Communications) (registered trademark) method, etc.

The positioning processor 105, based on instructions stored in a program memory of the positioning processor 105 (not shown), functions as a summary data generating unit 105a, a receiving information obtaining unit 105b, a specifying unit 105c, an orbit information obtaining unit 105d, and an integrated data generating unit 105e.

Each unit of the positioning processor 105 includes, for example, a predetermined logic circuit, but this is merely one example and the present configuration is not limited to the above.

The summary data generating unit 105a generates a reception summary database DB (see FIG. 4A, etc.).

That is, the summary data generating unit 105a generates the reception summary database DB which summarizes the validity of the detailed orbit information of the navigation message from each positioning satellite S based on the signal transmitted from each positioning satellite S and received by the receiving antenna 103a of the positioning unit 103 in the positioning apparatus 1A. The positioning unit 103 periodically receives the signal transmitted from the positioning satellite S with the receiving antenna 103a, and the summary data generating unit 105a updates the contents of the reception summary database DB each time the signal is received by the receiving antenna 103a.

Here, with reference to FIG. 4A to FIG. 4C, the configuration of the reception summary database DB is described in detail.

According to the description below, the apparatus No. to discriminate the positioning apparatuses 1A to 1C is "1" to "3", and FIG. 4A to FIG. 4C schematically describe an example of a reception summary database DB generated by the summary data generating unit 105a of the 3 positioning apparatuses 1A to 1C.

The reception summary database DB includes receiving information including whether detailed orbit information showing the position of each positioning satellite S with a predetermined term is received by the receiving antenna 103a. Specifically, the satellite identification No. to discriminate the positioning satellite S, the validity of the detailed orbit information such as Ephemeris information, and reception time of the signal are corresponded to each other.

Here, the satellite identification No. is a number individually attached to all positioning satellites S, for example, the satellite identification Nos. for the GPS satellites are "1" to "32", and the satellite identification No. for the quasi zenith satellite of Japan, "MICHIBIKI" is "193".

In the validity of the detailed orbit information, "1" represents "valid" showing that the detailed orbit information is received, and "0" represents "invalid" showing that the detailed orbit information is not received.

The reception time of the signal includes time information showing the time that the detailed orbit information is received. For example, the time is coordinated universal time shown with 24 hours. When the detailed orbit information is not received, the space is left blank "-".

For example, as shown in FIG. 4A, when reception summary database DB is generated by the positioning apparatus 1A of the apparatus No. 1, "1" showing that the detailed orbit information corresponding to the GPS satellite with the satellite identification No. 1 is "valid" is corresponded with the signal receiving time "20:10". As for the detailed orbit information corresponding to the GPS satellite of the satellite identification No. 2, "0" shows that the detailed orbit information is "invalid", and the space for the receiving time of the signal is left as a blank "-". As for the detailed orbit information corresponding to the GPS satellite with the satellite identification No. 31, "0" shows that the detailed orbit information is "invalid", and the space for the receiving time of the signal is left as a blank "-". As for the detailed orbit information corresponding to the GPS satellite with the satellite identification No. 32, "1" showing that the detailed orbit information is "valid" is corresponded with the receiving time of the signal "20:30".

Similarly, as shown in FIG. 4B, in the reception summary database DB generated by the positioning apparatus 1B of the apparatus No. 2, "1" showing that the detailed orbit information corresponding to the GPS satellite with the satellite identification No. 1 is "valid" is corresponded with the receiving time of the signal "21:00". Moreover, "1" showing that the detailed orbit information corresponding to the GPS satellite with the satellite identification No. 2 is "valid" is corresponded with the receiving time of the signal "20:30". Moreover, "1" showing that the detailed orbit information corresponding to the GPS satellite with the satellite identification No. 31 is "valid" is corresponded with the receiving time of the signal "20:50". Moreover, "0" shows that the detailed orbit information corresponding to the GPS satellite with the satellite identification No. 32 is "invalid" and the space for the receiving time of the signal is left blank "-".

Similarly, as shown in FIG. 4C, in the reception summary database DB generated by the positioning apparatus 1C of the apparatus No. 3, "0" showing that the detailed orbit information corresponding to the GPS satellite of the satellite identification No. 1 is "invalid" and the space for the receiving time of the signal is left blank "-". Moreover, "1" showing that the detailed orbit information corresponding to the GPS satellite with the satellite identification No. 2 is "valid" is corresponded with the receiving time of the signal "21:00". Moreover, "0" shows that the detailed orbit information corresponding to the GPS satellite with the satellite identification No. 31 is "invalid" and the space for the receiving time of the signal is left blank "-". Moreover, "1" showing that the detailed orbit information corresponding to the GPS satellite with the satellite identification No. 32 is "valid" is corresponded with the receiving time of the signal "21:00".

Contents of the reception summary database DB shown in FIG. 4A to FIG. 4C are merely examples not limited to the above, and suitable changes can be made. The GPS satellite is provided as an example of the positioning satellite S, but this is merely one example and the satellite is not limited to the above. For example, other positioning satellites S for GNSS such as Glonass, Galileo, BeiDou, etc. and the quasi zenith satellite of Japan, "MICHIBIKI" can be similarly represented with the validity of the detailed orbit information and the receiving time of the signal.

The receiving information obtaining unit 105b obtains the reception summary database DB generated by other positioning apparatuses 1B, 1C.

That is, the receiving information obtaining unit 105b functions as the second obtaining unit and obtains the reception summary database DB as the receiving information showing that the detailed orbit information showing the position of the other positioning satellites S in other predetermined terms is received with the receiving antenna 103a of the other positioning apparatuses 1B, 1C.

Specifically, the communication controller 104 communicates with the positioning apparatuses 1B, 1C connected through the predetermined communication network N and transmits the reception summary database DB [apparatus No. 1] (see FIG. 4A) generated by the summary data generating unit 105a. The communication controller 104 receives the reception summary database DB [apparatus No. 2] (see FIG. 4B) and the reception summary database DB [apparatus No. 3] (see FIG. 4C) transmitted from each of the positioning apparatuses 1B, 1C. Here, the communication controller 104 may transmit the reception summary database DB [apparatus No. 1] after performing predetermined processing to convert to the predetermined format or may perform processing to return the format to the original format on the received reception summary database DB [apparatus No. 2] and reception summary database DB [apparatus No. 3].

Then, the receiving information obtaining unit 105b obtains the reception summary database DB [apparatus No. 2] and the reception summary database DB [apparatus No. 3] received by the communication controller 104.

The specifying unit 105c specifies other positioning satellites S.

That is, based on the reception summary database DB regarding other positioning apparatuses 1B, 1C obtained by the receiving information obtaining unit 105b, the specifying unit 105c specifies the positioning satellite S with the detailed orbit information which the receiving antenna 103a tried to receive but could not receive and which the other positioning apparatuses 1B, 1C received as the other positioning satellites S.

Specifically, the specifying unit 105c compares the contents of the reception summary database DB [apparatus No. 1] generated by the summary data generating unit 105a with the contents of the reception summary database DB [apparatus No. 2] and the reception summary database DB [apparatus No. 3] obtained by the receiving information obtaining unit 105b. The specifying unit 105c specifies the positioning satellite S with the detailed orbit information not received by the receiving antenna 103a and the detailed orbit information received by the other positioning apparatuses 1B, 1C as the other positioning satellite S. Here, when the other detailed orbit information received by the other positioning apparatuses 1B, 1C is newer than the other detailed orbit information received by the receiving antenna 103a, the specifying unit 105c specifies the positioning satellite S related to the other detailed orbit information as the other positioning satellite S. That is, the specifying unit 105c refers to the space of the receiving time corresponding to each positioning satellite S in the reception summary database DB, and regarding the positioning satellite S (for example, GPS satellite etc. of the satellite identification No. 32) with the detailed orbit information (one orbit information) received by the receiving antenna 103a, if detailed orbit information with a receiving time newer than the above detailed orbit information is received by other positioning apparatuses (for example, positioning apparatus 1C, etc.) (the other time including the time information of the reception summary database DB is newer than the one time that the receiving antenna 103a received the other orbit information), the specifying unit 105c may specify such positioning satellite S as the other positioning satellite S (see FIG. 4A and FIG. 4C).

Here, for example, regarding the ephemeris information, IODE showing how new the update is used as the update information, the positioning satellite S with the detailed orbit information received by the other positioning apparatuses 1B, 1C having an update newer than the detailed orbit information received by the receiving antenna 103a may be specified as the other positioning satellite S. That is, when the newness of the other update included in the update information of the reception summary database DB is newer than the newness of the one update included in the other detailed orbit information received by the receiving antenna 103a, the specifying unit 105c may specify the positioning satellite S with the other detailed orbit information as the other positioning satellite S.

For example, regarding the GPS satellite with the satellite identification No. 1, the receiving time of the positioning apparatus 1B is newer than the receiving time of the positioning apparatus 1A. The GPS performs update of the ephemeris information every 2 hours, and it is assumed in the present embodiment that the latest update is performed at "20:00". With this, it is determined that the detailed orbit information received by the positioning apparatus 1A can be used (see FIG. 4A and FIG. 4B).

When the detailed orbit information (for example, detailed orbit information regarding the GPS satellite of the satellite identification No. 2) regarding the positioning satellite S which is not received by the receiving antenna 103a is received by the plurality of other positioning apparatuses 1, . . . , similar to the above, the positioning apparatus 1 (for example, positioning apparatus 1C) with the detailed orbit information receiving time being newer can be employed, and based on the update information such as the IODE, etc. the positioning apparatus 1 (for example, positioning apparatus 1B, etc.) which received the old but usable detailed orbit information can be employed (see FIG. 4B and FIG. 4C).

Then, the specifying unit 105c summarizes the specified other positioning apparatuses S and generates the detailed request list data R (see FIG. 5) to request the detailed orbit information to the other positioning apparatuses 1B, 1C. The detailed request list data R may be output to the memory 102 and temporarily stored in the memory 102.

FIG. 5 schematically shows an example of a detailed request list data R generated by the positioning apparatus 1A with the positioning apparatuses 1B, 1C as the other positioning apparatuses 1.

Specifically, in the detailed request list data R, the apparatus No. to discriminate the positioning apparatus 1 which is to be the request destination of the detailed orbit information, the satellite identification No. to discriminate the positioning satellite S, the validity of the detailed orbit information such as the ephemeris information, and the receiving time of the signal are associated to each other.

For example, as shown in FIG. 5, the positioning apparatus 1B of the apparatus No. 2 as the request destination of the detailed orbit information, the GPS satellite with the satellite identification No. 2, "1" showing that the detailed orbit information is "valid", and "20:30" which is the receiving time of the signal are associated with each other. Moreover, the positioning apparatus 1B of the apparatus No. 2 as the request destination of the detailed orbit information, the GPS satellite with the satellite identification No. 31, "1" showing that the detailed orbit information is "valid", and "20:50" which is the receiving time of the signal are associated with each other. Moreover, the positioning apparatus 1C of the apparatus No. 3 as the request destination of the detailed orbit information, the GPS satellite with the satellite identification No. 32, "1" showing that the detailed orbit information is "valid", and "21:00" which is the receiving time of the signal are associated with each other.

Here, the apparatus No., the satellite identification No., the validity of the detailed orbit information, and the receiving time of the signal, are similar to the contents as described in the description of the reception summary database DB (see FIG. 4A to FIG. 4C) and the detailed description is omitted.

The contents of the detailed request list data R as shown in FIG. 5 is merely one example, and the contents are not limited to the above. Suitable change can be made. That is, at least the apparatus No. of the positioning apparatus 1 which is to be the request destination of the detailed orbit information, and the satellite identification No. of the positioning satellite S are necessary, and the spaces for the validity of the detailed orbit information and the signal receiving time do not have to be provided.

The orbit information obtaining unit 105d obtains the detailed orbit information transmitted from the other positioning apparatuses 1B, 1C.

That is, the orbit information obtaining unit 105d functions as the first obtaining unit and obtains the detailed orbit information (other orbit information) which is transmitted from the positioning satellite S specified as the other positioning satellite S by the specifying unit 105c, not received by the receiving antenna 103a, and received by other positioning apparatuses 1B, 1C. Specifically, the orbit information obtaining unit 105d obtains from the memory 102 the detailed orbit information regarding the positioning satellite S specified as the other positioning satellite S by the specifying unit 105c and the detailed orbit information received by the orbit information receiving unit 104c.

The integrated data generating unit 105e generates detailed integrated data I (see FIG. 6).

Specifically, the integrated data generating unit 105e generates the detailed integrated data I based on the detailed orbit information regarding the one positioning satellite S received by the receiving antenna 103a, and the detailed orbit information obtained by the orbit information obtaining unit 105d, that is, the detailed orbit information regarding the other positioning satellite S received by the other positioning apparatuses 1B, 1C. The detailed integrated data I may be output to the memory 102 and temporarily stored in the memory 102.

FIG. 6 schematically shows an example of the detailed integrated data I generated by the positioning apparatus 1A with the positioning apparatuses 1B, 1C as the other positioning apparatus 1.

In the detailed integrated data I, specifically, the satellite identification No. to identify the positioning satellite S, the validity of the detailed orbit information such as the ephemeris information, the receiving time of the signal and the contents of the detailed orbit information are associated with each other.

For example, as shown in FIG. 6, the GPS satellite with the satellite identification No. 1, "1" showing that the detailed orbit information is "valid", "20:30" which is the receiving time of the signal, and "data 1" as the contents of the detailed orbit information are associated with each other. The GPS satellite with the satellite identification No. 2, "1" showing that the detailed orbit information is "valid", "20:30" which is the receiving time of the signal, and "data 2" as the contents of the detailed orbit information are associated with each other. The GPS satellite with the satellite identification No. 31, "1" showing that the detailed orbit information is "valid", "20:50" which is the receiving time of the signal, and "data 31" as the contents of the detailed orbit information are associated with each other. The GPS satellite with the satellite identification No. 32, "1" showing that the detailed orbit information is "valid", "21:00" which is the receiving time of the signal, and "data 32" as the contents of the detailed orbit information are associated with each other.

Here, the detailed orbit information includes, for example, the state of each satellite necessary for positioning, clock correction coefficient, orbit detailed information (ephemeris), etc., and the above information are stored in the sub-frames 1 to 3 of the navigation message. In FIG. 6, the detailed orbit information of each positioning satellite S is shown as "data 1", "data 2", "data 31", "data 32", etc. so that it is possible to easily distinguish one another.

The satellite identification No., the validity of the detailed orbit information, and the receiving time of the signal are similar to the contents described in the description of the reception summary database DB (see FIG. 4A to FIG. 4C) and the detailed request list data R (see FIG. 5), and the detailed description is omitted.

The contents of the detailed integrated data I shown in FIG. 6 are merely one example, and the contents are not limited to the above. The contents can be suitably changed. That is, at least the satellite identification No. of the positioning satellite S and the contents of the detailed orbit information are necessary, and the spaces for the validity of the detailed orbit information and the signal receiving time do not have to be provided.

The storage 106 includes, for example, SSD (Solid State Drive), etc. and various kinds of information are stored. For example, the storage 106 stores position history data 106a accumulating the position of the user in a time series.

The position history data 106a includes position information such as longitude, latitude, and altitude, etc. of the positioning point measured by the positioning unit 103 and time information counted by a timekeeping unit (not shown) associated with each other.

Alternatively, the storage 106 may be, for example, a detachable storage medium (not shown) and may be able to control readout of data from the attached storage medium or writing of data on the storage medium.

The display 107 is provided with, for example, a LCD, etc., and displays various pieces of information in a display region under the control of the CPU of the central controller 101. Specifically, for example, based on the position history data 106a, the display 107 displays the position of the positioning point and the time associated with each other.

The operation input unit 108 is a unit to input various instructions to the positioning apparatus 1A.

Specifically, the operation input unit 108 includes various buttons (not shown) such as a power source button regarding ON/OFF of the power source of the positioning apparatus 1A, a cursor button pointing up, down, left and right and an enter button regarding selection and instruction of the mode or function, and the like (all not shown).

Then, when various buttons are operated by the user, the operation input unit 108 outputs the operation instruction according to the operated button to the central controller 101. The central controller 101 controls the various units to perform predetermined operation according to the input operation instruction output from the operation input unit 108.

The operation input unit 108 may include a touch panel formed as one with the display 107, and an operation instruction according to the predetermined operation can be output to the central controller 101 based on the predetermined operation of the touch panel by the user.

<Positioning Processing>

Next, the positioning processing performed by the positioning apparatus 1A is described with reference to FIG. 3 to FIG. 7C.

Figure 3:
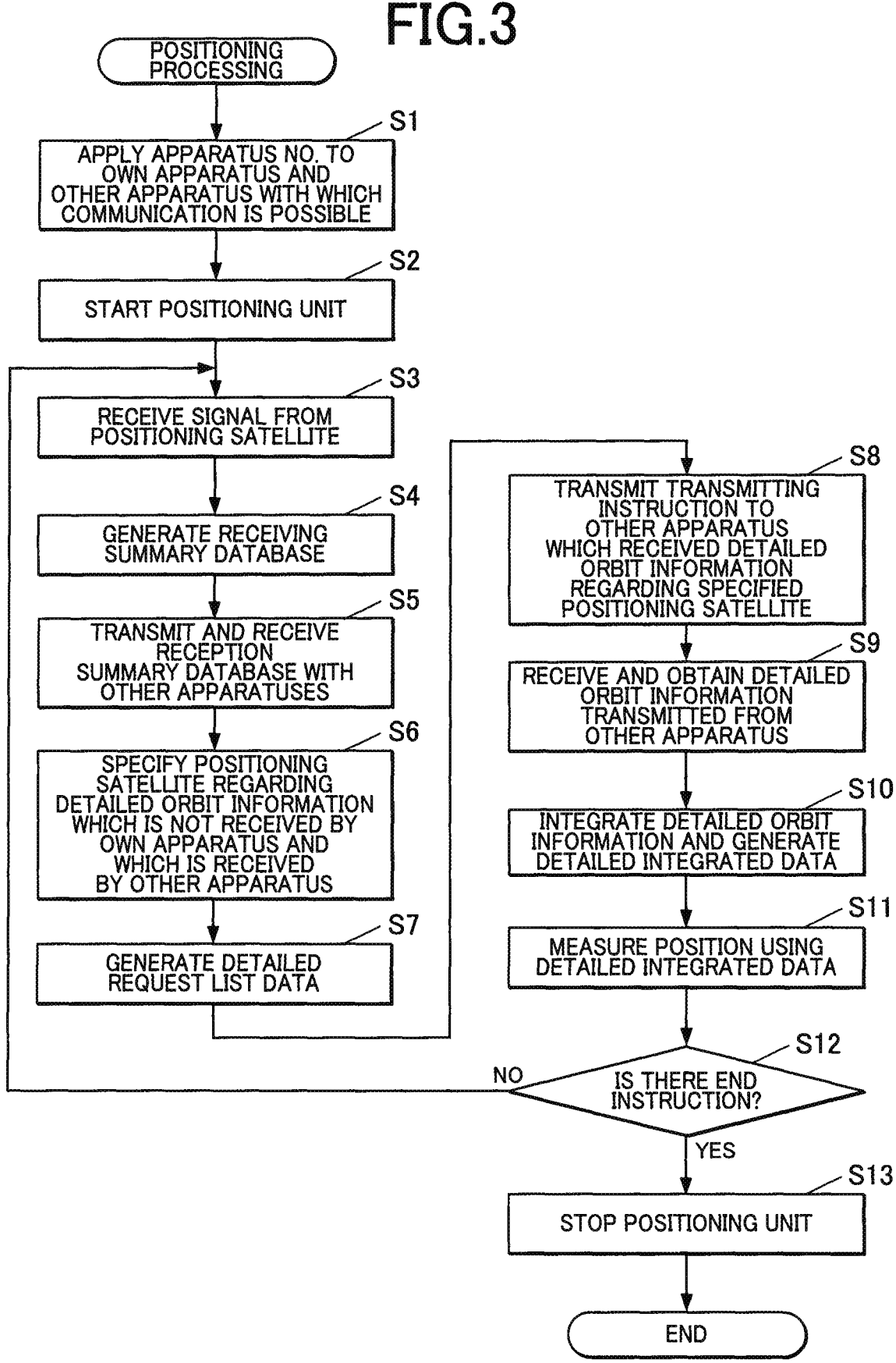
FIG. 3 is a flowchart showing an example of an operation regarding positioning processing by the positioning apparatus shown in FIG. 2.
Figure 7A:
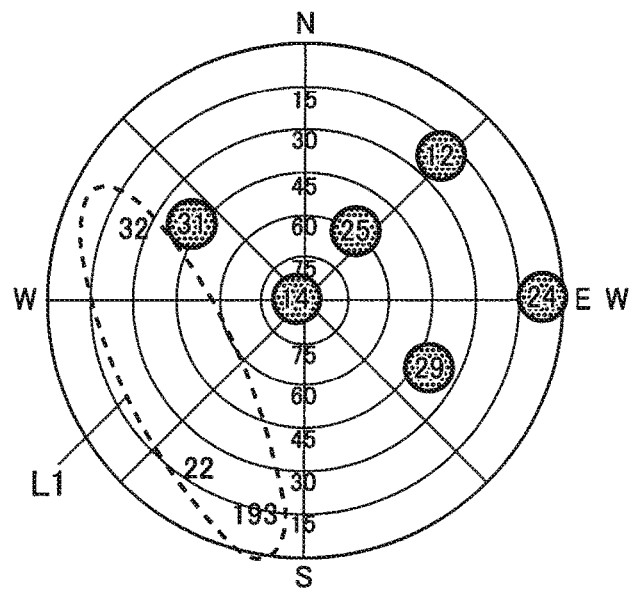
FIG. 7A is a diagram describing the positioning processing shown in FIG. 3.
Figure 7B:
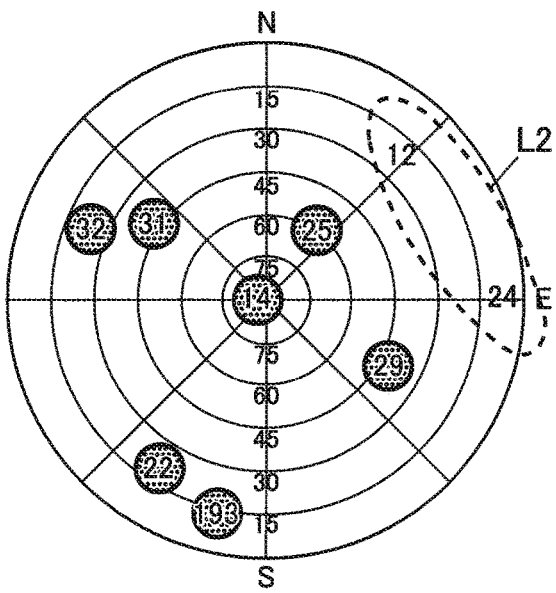
FIG. 7B is a diagram describing the positioning processing shown in FIG. 3.
Figure 7C:
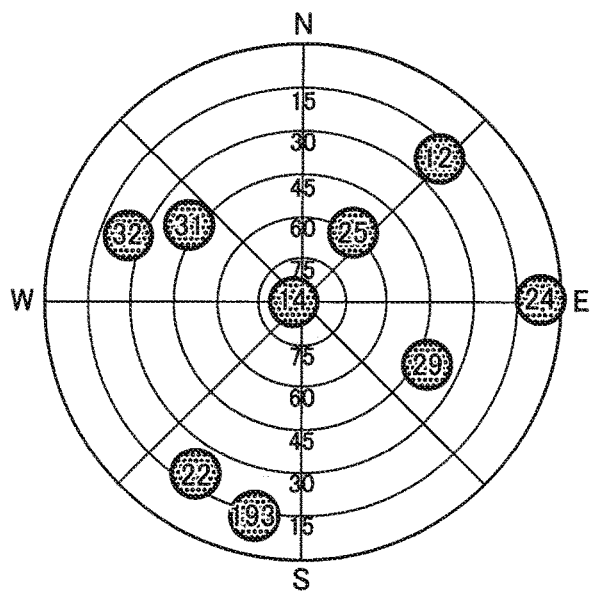
FIG. 7C is a diagram describing the positioning processing shown in FIG. 3.

FIG. 3 is a flowchart showing an example of operation regarding the positioning processing. FIG. 7A to FIG. 7C is a diagram to describe the positioning processing.

According to the description below, the positioning apparatus 1A is to be the own apparatus and the other positioning apparatuses 1B, 1C connected through the predetermined communication network N by the communication controller 104 is to be the other apparatus.

As shown in FIG. 2, the CPU of the central controller 101 assigns an apparatus No. to identify the positioning apparatus 1A which is the own apparatus and the other positioning apparatuses 1B, 1C which are the other apparatuses (step S1). For example, the positioning apparatus 1A is apparatus No. 1, the positioning apparatus 1B is apparatus No. 2, and the positioning apparatus 1C is apparatus No. 3.

Next, at a timing in which the positioning unit 103 is to intermittently receive the signal transmitted from the positioning satellite S, the CPU of the central controller 101 transmits a predetermined control signal to the positioning unit 103 and starts the positioning unit 103 (step S2). Then, the positioning unit 103 receives the signal (positioning code, navigation message, etc.) transmitted from the plurality of positioning satellites S, . . . at a predetermined timing (for example, 1 second interval, etc.) with the receiving antenna 103 (step S3).

Next, the summary data generating unit 105a of the positioning processor 105 generates the reception summary database DB summarizing the validity of the detailed orbit information of the navigation message for each positioning satellite S based on the signal received by the receiving antenna 103a of the positioning unit 103 (step S4). With this, the positioning apparatus 1A which is the own apparatus generates the reception summary database DB [apparatus No. 1] (see FIG. 4A), and the positioning apparatuses 1B, 1C which are the other apparatuses generates the reception summary database DB [apparatus No. 2] (see FIG. 4B) and the reception summary database DB [apparatus No. 3] (see FIG. 4C).

Next, the communication controller 104 transmits and receives the reception summary database DB between the other positioning apparatuses 1B, 1C connected through the predetermined communication network N, and the receiving information obtaining unit 105b obtains the reception summary database DB [apparatus No. 2] and the reception summary database DB [apparatus No. 3] generated by the other positioning apparatuses 1B, 1C (step S5).

Then, the specifying unit 105c compares the contents of the reception summary database DB [apparatus No. 1] of the positioning apparatus 1A which is the own apparatus with the contents of the reception summary database DB [apparatus No. 2] and the reception summary database DB [apparatus No. 3] generated by the other positioning apparatuses 1B, 1C and obtained by the receiving information obtaining unit 105b, and specifies the positioning satellite (other positioning satellite) S of which the detailed orbit information is not received by the receiving antenna 103a but is received by the other positioning apparatuses 1B, 1C (step S6). The specifying unit 105c also specifies the positioning satellite S of which the detailed orbit information is received by the positioning apparatus 1A but the detailed orbit information with a newer time is received by the other positioning apparatus 1 as the other positioning satellite S.

Next, the specifying unit 105c generates the detailed request list data R to request for the detailed orbit information regarding the specified other positioning satellite S to the other positioning apparatuses 1B, 1C (step S7; see FIG. 5).

Next, based on the detailed request list data R, as for the detailed orbit information of the other positioning satellite S which is not received by the receiving antenna 103a but is received by the other positioning apparatuses 1B, 1C, the request transmitting unit 104b of the communication controller 104 transmits through the predetermined communication network N the transmitting instruction of the detailed orbit information to the other positioning apparatus 1 (for example, positioning apparatus 1B for the detailed orbit information of the positioning satellite S of the satellite identification No. 2) which received the detailed orbit information (step S8).

Then, when the detailed orbit information is transmitted through the predetermined communication network from the other positioning apparatuses 1B, 1C in response to the transmitting instruction of the detailed orbit information, the orbit information receiving unit 104c receives the transmitted detailed orbit information (for example, the detailed orbit information of the positioning satellites S with the satellite identification No. 2 and No. 31 transmitted from the positioning apparatus 1B) and the orbit information obtaining unit 105d of the positioning processor 105 obtains the detailed orbit information received by the orbit information receiving unit 104c (step S9).

Then, the integrated data generating unit 105e integrates the detailed orbit information regarding one positioning satellite received by the positioning apparatus 1A which is the own apparatus with the detailed orbit information regarding the other positioning satellite S received by the positioning apparatuses 1B, 1C which is the other positioning apparatus 1, and generates the detailed integrated data I (see step S10; FIG. 6).

Next, based on the generated detailed integrated data I, the positioning unit 103 measures the position where the positioning apparatus 1A main body is (step S11). Specifically, based on the detailed integrated data I, the positioning unit 103 performs predetermined calculation to calculate the position of the positioning satellites S. After calculating the pseudo range information to each positioning satellite S, the positioning unit 103 performs predetermined calculation based on the position of each positioning satellite S to calculate the three dimensional coordinates (x, y, z) of the position where the positioning apparatus 1A is and the error of the clock of the positioning apparatus 1A main body.

Here, with reference to FIG. 7A to FIG. 7C, examples when the one positioning apparatus 1 receives any of the signal transmitted from the positioning satellite S (see FIG. 7A and FIG. 7B), and when the detailed integrated data I integrating the detailed orbit information is received is described (see FIG. 7C).

For example, as shown in FIG. 7A and FIG. 7B, there is a bias in reception of the detailed orbit information if there is only the detailed orbit information received from only one positioning apparatus 1 among the plurality of positioning apparatuses 1, . . . . Specifically, in FIG. 7A, for example, the detailed orbit information transmitted from the positioning satellites S with the satellite identification No. 22, No. 32, No. 193 in the broken line L1 is not received, and in FIG. 7B, the detailed orbit information transmitted from the positioning satellites S with the satellite identification No. 12, 24 in the broken line L2 is not received.

Turning to FIG. 7C, by integrating the detailed orbit information received by the 2 positioning apparatuses 1, 1, the position (DOP) of the positioning satellite S which can be used in the positioning processing is enhanced and the accuracy of the positioning processing can be enhanced.

The position information of the position where the generated positioning apparatus 1A main body exists is stored in the storage 106 as the position history data 106a, corresponded with the time information.

Next, for example, the CPU of the central controller 101 determines whether the instruction to end the positioning processing is input based on the predetermined operation on the operation input unit 108 by the user or satisfying a predetermined condition (for example, a predetermined amount of time passing, etc.) (step S12).

Here, when it is determined that the instruction to end the positioning processing is not input (step S12; NO), the CPU of the central controller 101 returns the processing to step S3, and similar to the above, the positioning unit 103 receives the signal transmitted from the plurality of positioning satellites S, . . . at a predetermined timing with the receiving antenna 103a. The processing from step S4 and after is substantially the same and the detailed description is omitted. According to the signal received in step S3, for example, the reception summary database DB is updated (step S4), the detailed request list data R is updated (step S7), the detailed integrated data I is updated (step S10), etc., and the above are performed sequentially.

In step S12, when it is determined that the instruction to end the positioning processing is input (step S12; YES), the CPU of the central controller 101 transmits the control signal to stop the positioning processing to the positioning unit 103 and stops the positioning unit 103 to end the positioning processing (step S13).

As described above, according to the positioning apparatus 1A of the positioning system 100 of the present embodiment, one detailed orbit information (for example, ephemeris information) showing a position of one positioning satellite S within a predetermined term is received. When the reception by the positioning apparatus 1A is attempted but it is not received and the other positioning apparatuses 1B, 1C receive the other detailed orbit information or when the other detailed orbit information received by the other positioning apparatuses 1B, 1C is newer than the other detailed orbit information received by the receiving antenna 103a, the other detailed orbit information received by the other positioning apparatuses 1B, 1C is obtained. Since the positioning processing is performed based on the received one detailed orbit information and the obtained other detailed orbit information, even when the number of positioning satellites S from which detailed orbit information is received by only the positioning apparatus 1A is relatively small or there is a bias in the position of the positioning satellite S which can be used due to the attaching position of the positioning apparatus 1A or there is a change in the receiving environment during movement, by using the other detailed orbit information received by the other positioning apparatuses 1B, 1C, the number of positioning satellites used in the positioning apparatus becomes relatively larger. With this, the position (DOP) of the positioning satellites S can be enhanced and the accuracy of the positioning processing can be enhanced.

Specifically, for example, when the signal transmitted from the positioning satellite S is received intermittently by the positioning apparatus 1A in order to save power, it is considered that since the receiving time is short, it is difficult to receive the navigation message suitably in a perfect decodable state. Consequently, it is effective to use the other detailed orbit information received by the other positioning apparatuses 1B, 1C for the purpose of enhancing the accuracy of the positioning processing.

The reception summary database DB showing that the other detailed orbit information is received by the other positioning apparatuses 1B, 1C is obtained. Based on the obtained reception summary database DB, when the reception is attempted by the positioning apparatus 1A but the other detailed orbit information is not received and the other detailed orbit information is received by the other positioning apparatuses 1B, 1C or when the other detailed orbit information received by the other positioning apparatuses 1B, 1C is newer than the other detailed orbit information received by the receiving antenna 103a, the positioning satellite regarding the other detailed orbit information is specified as the other positioning satellite S. The transmission request for the detailed orbit information regarding the specified other positioning satellite S is transmitted to the other positioning apparatuses 1B, 1C through the predetermined communication network N. The detailed orbit information regarding the other positioning satellite S transmitted from the other positioning apparatuses 1B, 1C in response to the transmission request is received. With this, the received detailed orbit information can be obtained as the other detailed orbit information. That is, by using the reception summary database DB, the positioning apparatus 1A is able to acknowledge beforehand the other positioning apparatuses 1B, 1C which received the necessary detailed orbit information regarding the positioning satellite S. With this, it is possible to efficiently obtain the necessary detailed orbit information regarding the positioning satellite S. That is, since there is no need to receive the detailed orbit information regarding all of the positioning satellites S received in the other positioning apparatuses 1B, 1C, the communicating time can be made shorter and the power can be saved.

For example, by communicating with the other positioning apparatuses 1B, 1C through the wireless PAN realized by a short range wireless communication standard and obtaining the reception summary database DB and the other detailed orbit information of the other positioning apparatuses 1B, 1C, there is no need to obtain the navigation message from external servers or to use A (assisted) GPS as in conventional methods, and the accuracy of the positioning processing can be enhanced while saving power.

By using the time information showing the time that the other positioning apparatuses 1B, 1C received the detailed orbit information included in the reception summary database DB, even when the detailed orbit information is received for the positioning satellite S by the positioning apparatus 1A, when the detailed orbit information with a newer time is received by the other positioning apparatuses 1B, 1C, the newer detailed orbit information can be obtained from the other positioning apparatuses 1B, 1C. Similarly, by using the update information (for example, IODE, etc.) showing the newness of the update of the detailed orbit information, as for the detailed orbit information received by the positioning apparatus 1A regarding the positioning satellite S, when the detailed orbit information with a newer update is received by the other positioning apparatuses 1B, 1C, a detailed orbit information with a newer update can be obtained from the other positioning apparatuses 1B, 1C.

The present invention is not limited to the above embodiment, and various modifications and changes in design can be made without leaving the scope of the invention.

For example, the positioning processing is performed using the detailed integrated data I integrating the one detailed orbit information received by the positioning apparatus 1A with the other detailed orbit information received by the other positioning apparatuses 1B, 1C, but this is merely one example, and suitable change can be made freely. That is, the integrated data generating unit 105e which generates the detailed integrated data I does not have to be provided, and the positioning processing can be performed based on the one detailed orbit information and the other detailed orbit information.

According to the above-described embodiment, based on the reception summary database DB [apparatus No. 2] and the reception summary database DB [apparatus No. 3] in the other positioning apparatuses 1B, 1C, the detailed request list data R to request the detailed orbit information regarding the other positioning satellite S to the other positioning apparatuses 1B, 1C is generated. Such detailed request list data R is referred and the transmitting instruction of the detailed orbit information is transmitted to the other positioning apparatuses 1B, 1C, but this is merely one example and the present invention is not limited to the above. That is, for example, after the reception summary database DB

[apparatus No. 1] of the positioning apparatus 1A which is the own apparatus is transmitted to the other positioning apparatuses 1B, 1C, the other positioning apparatuses 1B, 1C may confirm the contents of the reception summary database DB [apparatus No. 1] and the other positioning apparatuses 1B, 1C may automatically transmit the detailed orbit information of the positioning satellite S which is not received by the positioning apparatus 1A.

Moreover, the configuration of the positioning apparatus 1 illustrated in the above embodiment is merely one example, and the configuration is not limited to the above.

In addition, according to the present embodiment, the functions of the first receiving unit, the first obtaining unit and the positioning unit are realized by driving the reception antenna 103a, the orbit information obtaining unit 105d, and the positioning unit 103 but the configuration is not limited to the above. The above functions can be realized by the CPU of the central controller 101 performing predetermined programs, etc.

That is, a program including a receiving processing routine, an obtaining processing routine, and a positioning processing routine is stored in the program memory (not shown) storing the program. Then, the CPU of the central controller 101 may perform the following with the receiving processing routine. That is, to receive the one orbit information showing the position of the one positioning satellite S within one predetermined term transmitted from the one positioning satellite S and to attempt to receive the other orbit information showing the position of the other positioning satellite S within the other predetermined term transmitted from the other positioning satellite S different from the one positioning satellite S. Moreover, the CPU of the central controller 101 may perform the following with the obtaining processing routine. That is, to obtain the other orbit information received by the other positioning apparatuses 1B, 1C when the attempt to receive the other orbit information is made by the receiving processing routine but the other orbit information could not be received and the other orbit information is received by the other positioning apparatuses 1B, 1C or the other orbit information received by the other positioning apparatuses 1B, 1C is newer than the other orbit information received by the receiving processing routine. Moreover, the CPU of the central controller 101 may perform the positioning processing routine so as to perform the positioning processing based on the received one orbit information and the obtained other orbit information.

Similarly, the functions of the second obtaining unit, the specifying unit, the transmission unit, and the second receiving unit are realized by the CPU of the central controller 101 performing predetermined programs, etc.

As the computer-readable medium storing the program to perform the above processing, in addition to a ROM, hard disk, etc., a nonvolatile memory such as a flash memory or a portable storage medium such as a CD-ROM can be applied. Moreover, a carrier wave can be applied as a medium providing program data through a predetermined communication line.

While various embodiments have been described herein, the present invention is not limited to the above-described embodiments, and it is to be appreciated that various changes in form and detail may be made without departing from the spirit and scope of the invention(s) presently or hereafter claimed. Various steps of the invention are included in the embodiments and various inventions can be extracted by suitably combining the plurality of disclosed components. For example, if the problems to be solved by the present invention can be solved and the effects of the present invention can be achieved by deleting some components among all components of the embodiments or by combining some components in a different form, the present invention may be extracted from the configuration with deleted components or the configuration with differently combined components.

What is claimed is:

1. A positioning apparatus comprising:
   one or more processors; and
   one or more memories storing instructions that, in response to being executed by the one or more processors, cause the one or more processors to perform:
      receiving to receive one piece of orbit information showing a position of one positioning satellite within one predetermined term transmitted from the one positioning satellite and which attempts to receive another piece of orbit information showing a position of another positioning satellite within another predetermined term transmitted from another positioning satellite different from the one positioning satellite;
      obtaining to obtain the another piece of orbit information received by another positioning apparatus (i) in response to, in the receiving, receiving the another piece of orbit information is attempted but the another piece of orbit information is not received and the another piece of orbit information is received by the another positioning apparatus or (ii) in response to, in the receiving, the another piece of orbit information received by the another positioning apparatus is newer than the another piece of orbit information received in the receiving; and
      positioning processing based on the one piece of orbit information received in the first receiving and the another piece of orbit information obtained in the first obtaining.

2. The positioning apparatus according to claim 1, wherein the one or more processors, under control of the instructions, further perform:
   receiving information obtaining to obtain a piece of receiving information showing that the another piece of orbit information is received by the another positioning apparatus; and
   specifying to, based on the piece of receiving information obtained in the receiving information obtaining, specify a positioning satellite regarding the another piece of orbit information as the another positioning satellite (i) in response to, in the receiving, receiving the another piece of orbit information is attempted but the another piece of orbit information is not received and the another piece of orbit information is received by the another positioning apparatus, or (ii) in response to, in the receiving, the another piece of orbit information received by the another positioning apparatus is newer than the another piece of orbit information received in the receiving,
   wherein the one or more processors, in the obtaining, obtain the piece of orbit information regarding the positioning satellite specified as the another positioning satellite in the specifying as the another piece of orbit information.

3. The positioning apparatus according to claim 2, wherein the one or more processors, under control of the instructions, further perform:
   transmitting to transmit a transmitting instruction of the piece of orbit information regarding the positioning satellite specified as the other positioning satellite in the specifying to the another positioning apparatus through a communication line; and positioning apparatus, orbit information receiving to receive the piece of orbit information transmitted through the communication line from the another positioning apparatus, wherein the one or more processors, in the obtaining, obtain the piece of orbit information received in the positioning apparatus, orbit information receiving as the another piece of orbit information.

4. The positioning apparatus according to claim 2, wherein the piece of receiving information includes a piece of time information showing another time at which the another piece of orbit information is received by the another positioning apparatus; and wherein the one or more processors, under control of the instructions, in the specifying, specify the positioning satellite regarding the another piece of orbit information as the another positioning satellite in response to the another time included in the piece of time information of the piece of receiving information is newer than one time that the another piece of orbit information is received in the receiving.

5. The positioning apparatus according to claim 2, wherein the piece of receiving information includes a piece of update information showing newness of another update of the another piece of orbit information received by the another positioning apparatus; and wherein the one or more processors, under control of the instructions, in the specifying, specify the positioning satellite regarding the another piece of orbit information as the another positioning satellite in response to the newness of the another update included in the piece of update information of the piece of receiving information is newer than newness of one update included in the another piece of orbit information received in the receiving.

6. A non-transitory recording medium having a program recorded thereon that is executable to control a computer to perform:

receiving one orbit information showing a position of one positioning satellite within one predetermined term transmitted from the one positioning satellite and attempting to receive another orbit information showing a position of another positioning satellite within another predetermined term transmitted from another positioning satellite different from the one positioning satellite;

obtaining the another orbit information received by another positioning apparatus in response to the receiving of the another orbit information is attempted but the another orbit information is not received and the another orbit information is received by the another positioning apparatus or the another orbit information received by the another positioning apparatus is newer than the another orbit information received in the receiving; and positioning processing based on the one orbit information received in the receiving and the another orbit information obtained in the obtaining.

7. The non-transitory recording medium according to claim 6, wherein the computer under the control of the program further performs:

receiving information obtaining to obtain a piece of receiving information showing that the another piece of orbit information is received by the another positioning apparatus; and specifying to, based on the piece of receiving information obtained in the receiving information obtaining, specify a positioning satellite regarding the another piece of orbit information as the another positioning satellite (i) in response to, in the receiving, receiving the another piece of orbit information is attempted but the another piece of orbit information is not received and the another piece of orbit information is received by the another positioning apparatus, or (ii) in response to, in the receiving, the another piece of orbit information received by the another positioning apparatus is newer than the another piece of orbit information received in the receiving, wherein, in the first obtaining, obtaining the piece of orbit information regarding the positioning satellite specified as the another positioning satellite in the specifying as the another piece of orbit information.

8. The non-transitory recording medium according to claim 7, wherein the computer under the control of the program further performs:

transmitting to transmit a transmitting instruction of the piece of orbit information regarding the positioning satellite specified as the other positioning satellite in the specifying to the another positioning apparatus through a communication line; and positioning apparatus, orbit information receiving to receive the piece of orbit information transmitted through the communication line from the another positioning apparatus, wherein, in the obtaining, obtaining the piece of orbit information received in the positioning apparatus, orbit information receiving as the another piece of orbit information.

9. The non-transitory recording medium according to claim 7, wherein the piece of receiving information includes a piece of time information showing another time at which the another piece of orbit information is received by the another positioning apparatus; and wherein, in the specifying, specifying the positioning satellite regarding the another piece of orbit information as the another positioning satellite in response to the another time included in the piece of time information of the piece of receiving information is newer than one time that the another piece of orbit information is received in the receiving.

10. The non-transitory recording medium according to claim 7, wherein the piece of receiving information includes a piece of update information showing newness of another update of the another piece of orbit information received by the another positioning apparatus; and wherein, in the specifying, specifying the positioning satellite regarding the another piece of orbit information as the another positioning satellite in response to the newness of the another update included in the piece of update information of the piece of receiving information is newer than newness of one update included in the another piece of orbit information received in the receiving.

* * * * *

UNITED STATES PATENT AND TRADEMARK OFFICE
CERTIFICATE OF CORRECTION

PATENT NO. : 10,677,931 B2
APPLICATION NO. : 15/464621
DATED : June 9, 2020
INVENTOR(S) : Ryuji Shingyoji It is certified that error appears in the above-identified patent and that said Letters Patent is hereby corrected as shown below:

In the Claims

Claim 1, Column 18, Line 37, before "obtaining." delete "first".

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*